United States Patent [19]
Masaki et al.

[11] Patent Number: 6,104,854
[45] Date of Patent: Aug. 15, 2000

[54] LIGHT REGULATOR AND SURFACE LIGHT SOURCE DEVICE

[75] Inventors: Kayoko Masaki; Kazumasa Ohsumi, both of Kawaguchi, Japan

[73] Assignees: Enplas Corporation, Kawaguchi; Yasuhiro Koike, Yokohama, both of Japan

[21] Appl. No.: 08/828,679

[22] Filed: Mar. 31, 1997

[30] Foreign Application Priority Data

Mar. 29, 1996 [JP] Japan .................................. 8-104444

[51] Int. Cl.[7] .............................................. F21V 8/00
[52] U.S. Cl. ........................ 385/133; 349/62; 362/31
[58] Field of Search ............................. 385/133; 349/62; 362/31

[56] References Cited

U.S. PATENT DOCUMENTS

| | | | |
|---|---|---|---|
| 5,381,309 | 1/1995 | Borchardt | 362/31 |
| 5,408,388 | 10/1998 | Kobayashi et al. | 362/31 |
| 5,587,816 | 12/1996 | Gunjima et al. | 349/62 |
| 5,816,677 | 10/1998 | Kurematsu et al. | 362/31 |
| 5,833,344 | 11/1998 | Arai et al. | 362/31 |
| 5,944,405 | 8/1999 | Takeuchi et al. | 362/31 |

FOREIGN PATENT DOCUMENTS 7-198913  8/1995  Japan .

*Primary Examiner*—Rodney Bovernick
*Assistant Examiner*—Ellen E. Kim
*Attorney, Agent, or Firm*—Staas & Halsey, LLP

[57] ABSTRACT

A light regulator and a surface light source device employing the light regulator. For liquid-crystal display applications, the surface light source device can effectively prevent degradation in the quality of the emitted light and can reliably provide the required directivity correction. The light regulator is formed by laminatedly arranging a light scattering surface between first and second sheet-like members. The two sheet-like members mutually differ in shape, material and refractive index. Scattering means arranged between the first and second sheet-like members prevents Newton's rings due to spaces between the two sheet-like members from occurring. A light diffusion sheet may be disposed between the first and second sheet-like members.

10 Claims, 6 Drawing Sheets

PRISM SHEET

PRISM SHEET

SURFACE LIGHT SOURCE DEVICE OF SIDE-LIGHT TYPE

LIGHT REGULATOR AND SURFACE LIGHT SOURCE DEVICE

BACKGROUND OF THE INVENTION

The present invention relates to a light source device that can be applied to a backlighting arrangement of a liquid-crystal display or the like and further relates to a light regulator or light regulator member (hereinafter referred to simply as "light regulator") for use with the light source device. Surface light source devices for liquid-crystal display backlighting applications include a type in which the primary light source is provided at the rear surface of a plate-shaped optical member having a surface from which the illuminating light is emitted, and a type in which the primary light source is provided at a side surface of the plate-shaped optical member. The latter type is termed a side-light type surface light source device. In both types of surface light source device, a light regulator in the form of a prism sheet is disposed usually on the light emission surface of the plate-shaped optical member to correct the directivity of the illuminating light.

Side-light type surface light source devices include a plate-shaped optical member that functions as a light guide plate, and a rod-shaped primary light source arranged at the side of the plate-shaped optical member. Light from the primary light source is deflected by the light guide plate and emitted from the major surface of the light guide plate to be used for backlighting of, for example, a liquid-crystal panel. Since the primary light source is arranged at the side of the light guide plate, side-light type surface light source devices generally have the advantage of being very thin.

Types of light guide plates employed in side-light surface light source devices include those that are substantially uniform in thickness, and those having a tendency to decrease in thickness going away from the primary light source. The latter type generally can emit light more efficiently than the former type.

FIG. 9 is a disassembled perspective view of a conventional side-light surface light source device of the latter type. With reference to FIG. 9, the side-light surface light source device 1 includes a light guide plate 2, a primary light source 3 disposed alongside the light guide plate 2, a reflection sheet 4, and a light regulator in the form of a prism sheet 5. The reflection sheet 4, light guide plate (plate-shaped optical member) 2 and prism sheet 5 are stacked to form a laminated arrangement. The light guide plate 2 is, for example, a light scattering guide plate made of light scattering and guiding material. The primary light source 3 has a cold-cathode tube or fluorescent lamp 6, and a regular reflector 7 around part of the circumference of the lamp 6. Scattered light from the reflector 7 impinges on edge T of the light guide plate 2.

The reflection sheet 4 is a sheet-like regular reflection member of metal foil or the like, or a sheet-like irregular reflection member of white PET film or the like. Light that leaks from the light guide plate 2 is reflected back to the light guide plate 2 by the reflection sheet 4. The light guide plate 2, which has a wedge-shaped cross-section, has an internal scattering power. The light guide plate 2 is comprised of matrix of, for example, polymethyl methacrylate (PMMA) which contains a uniform distribution of light-permeable particles having a different refractive index from that of the matrix material.

With reference to FIG. 10, which is a sectional view along line A—A of FIG. 9, the edge of the light guide plate 2 near the primary light source 3 provides the light incidence surface T. Light L from the primary light source 3 enters the light guide plate 2, where it is scattered by the particles and reflected by the reflection sheet 4. When the reflection sheet 4 is an irregular reflector, the light is subjected to irregular reflection. The light L is propagated in a series of repeated reflections repeatedly between the (sloping) surface near the reflection sheet 4 and the surface near the prism sheet 5 (hereinafter referred to as "exit surface"). In this specification, the surface near the reflection sheet 4 will be referred to as the "sloping surface," and the surface near the prism sheet 5 will be referred to as the "exit surface."

In the course of this propagation, each time the light L is reflected by the sloping surface, the angle of incidence of the light relative to the exit surface decreases. Also, each time the light impinges on the exit surface, the component that forms an angle of incidence relative to the exit surface equal to or below the critical angle is emitted from the exit surface. Light L that exits from the exit surface is light that has been scattered by the particles in the light guide plate 2 and irregularly reflected by the reflection sheet 4. However, as is well known, the principal direction of the emitted light L is inclined toward the end of the wedge. Thus, the light L is not emitted in random directions, but with quite some directivity. This characteristic of the light guide plate 2 and side-light surface light source device 1 will be referred to as the "directional emission characteristics." This directivity is in a plane perpendicular to the lamp 6.

The prism sheet 5 is formed of a light-permeable sheet of polycarbonate or the like, with prisms on both surfaces. In addition to correcting the above directivity, the prism sheet 5 can also serve to correct the directional propagation characteristics of the light in a longitudinal plane of the lamp 6, as required. The prism surfaces are each provided with an array of projections each comprised of a pair of inclined faces to form a triangular cross-section, with the projections on one surface being arrayed perpendicularly to the projections on the other surface. For example, the projections on the inner prism surface are aligned substantially parallel to the light incidence surface T of the light guide plate 2, as shown in the enlarged inset indicated by arrow B, while the projections on the outer prism surface run perpendicular to the light incidence surface T, as shown in the enlarged inset indicated by arrow C. In the description given herein, the orientation parallel to the surface T is referred to as the X-direction and that perpendicular to the surface T is referred to as Y-direction.

With respect to Y-direction, the projections on the inner side of the prism sheet 5 correct the principal direction of the emitted light L to the front, while with respect to the X-direction, the projections on the outer side reduce light divergence. If required, the angle of the sloping surface of the prism sheet can be adjusted to provide the side-light surface light source device 1 with a desired directivity. It should be noted that light components impinging on the prism sheet 5 at or above the critical angle are reflected back into the light guide plate 2 to be reutilized in the generation of illuminating light. A single-sided prism sheet may be used. In general, a side-light surface light source device 1 that uses a wedge-shaped light guide plate and prism sheet as above can be expected to output light to the front more efficiently than a side-light surface light source device having a light guide plate of substantially uniform thickness.

Instead of the light-permeable particles described above, there is known the use of a semi-transparent light scattering guide plate comprised of transparent resin in which particles of silica or the like are distributed. It should also be noted that a light guide plate with directional emission characteristics may be used without employing a scattering guide plate. For example, a light guide plate formed of a transparent member with a matted exit surface and/or sloping surface has directional emission characteristics. Similarly, a light guide plate having directional emission characteristics can be obtained by using a transparent light guide plate with a micro-lens array, scattering layer or the like on the exit surface and/or sloping surface. While there will be some difference, employment of a prism sheet to correct the directivity, as in the case of the side-light surface light source device described with reference to FIG. 9, will provide an efficient output of light to the front, even with such a guide plate.

When a side-light surface light source device that has a flat-plate-shaped light guide plate, matting, a micro-lens array or a light scattering layer or the like is provided on the exit surface and/or the other surface. The flat-plate-shaped light guide plate replaces the light guide plate 2 shown in FIG. 9. In such a case, the prism sheet can be used to correct the directivity of the emitted light through selective transmission of the illuminating light emitted as scattered light from the exit surface of the guide, so that the emitted light is concentrated to the front.

Various directivity characteristics will be desired with the above-described various types of side-light surface light source devices, depending on the devices to be applied to. As such, it is necessary to adjust the correctional function of the prism sheet in accordance with the directivity required. This has to be done by adjusting the design values of the angles of the prism sloping and/or the refractive index of the material. However, such methods are subject to limits in adjusting directivity. Moreover, there is little difference between design changes involving only one prism surface and design changes that involve the whole prism sheet. Even if, for example, it is only necessary to alter the directivity adjustment capability in the X-direction, a new mold still has to be made up to form the whole prism sheet. In addition, time is required to check the characteristics of the newly-fabricated prism sheet.

Viewing from another standpoint, with this type of prism sheet, the ends of the projections on the exit surface tend to be deformed, reducing the inclined-face proportion, as shown in FIG. 11. This can degrade the directivity and give rise to adhesion with the guide plate. This deformation can be prevented by using a transparent resin having a high thermosoftening point. However, the refractive index of such resin will limit the characteristics of the prism sheet and produce a further decrease in the range of adjustability.

The use of a lamination of single-sided prism sheets instead of a double-sided prism sheet can be expected to resolve these drawbacks. A lamination of single-sided sheets also enables directivity correction in X- the and Y-directions to be adjusted independently, by changing the combination of sheets employed. The result is that illuminating light of a desired directivity can be more easily obtained than when a double-sided prism sheet arrangement is employed. Moreover, the range of adjustability can be expanded by combining single-sided prism sheets having different refractive indexes. Also, degradation in directivity caused by deformation of the projections can be prevented by forming one of the single-sided prism sheets of transparent resin having a high thermosoftening point.

A problem that does arise when a lamination of single-sided prism sheets is employed is that minute spaces between the laminations can produce Newton's rings, degrading the quality of the emitted light. Also, long-term use and other factors can cause partial adhesion of single-sided prism sheets to the exit surface, giving rise to unnatural patterns or fringes. One way of resolving such problems is to optically bond the single-sided prism sheets. However, when a sheet such as a single-sided prism sheet that is formed as a repeated configuration in one direction and supported by bonding exhibits a thermal contraction in the direction of the projections that is different from the thermal contraction perpendicular thereto. Therefore, a heat cycle can produce cloudiness of bonded surfaces, reducing the quality of the emitted light.

SUMMARY OF THE INVENTION

An object of the present invention is to provide a light regulator and surface light source device that effectively prevents degradation of the quality of emitted light and enables a required directivity to be obtained readily and reliably.

In accordance with this invention, the above object is attained by a light regulator comprising a first sheet-like member formed as a repetition of a shape configuration having an inclined surface, a second sheet-like member formed as a repetition of a shape configuration having an inclined surface, and light scattering means, wherein the first sheet-like member, second sheet-like member and light scattering means are laminatedly arranged with the light scattering means disposed between the first and second sheet-like members.

The light scattering means may be a diffusion sheet disposed between the first and second sheet-like members. Or, at least one of the opposing surfaces of the first and second sheet-like members may be a light scattering surface, in which case the light scattering surface will constitute the light scattering means.

The first and second sheet-like members are preferably formed of different materials, especially materials having different refractive indexes.

This invention also provides an improved surface light source device by applying the above light regulator to a surface light source device. In the improved surface light source device, directivity of illuminating light emitted from an exit surface of a plate-shaped optical member is corrected by the light regulator arranged along the exit surface. More specifically, the light regulator includes a first sheet-like member formed as a repetition of a shape configuration having an inclined surface, a second sheet-like member formed as a repetition of a shape configuration having an inclined surface, and a light scattering means, with these first and second sheet-like members and light scattering means being laminatedly arranged with the light scattering means between the first and second sheet-like members.

The light scattering means may be a diffusion sheet disposed between the first and second sheet-like members. Or, at least one of the opposing surfaces of the first and second sheet-like members may be a light scattering surface, in which case the light scattering surface will constitute the light scattering means.

The first and second sheet-like members are preferably formed of different materials, especially materials having different refractive indexes.

In this arrangement according to the present invention, the light scattering means disposed between the first and second sheet-like members reduces interference fringes between the first and second sheet-like members, thereby preventing the generation of Newton's rings.

Since in accordance with this invention the first and second sheet-like members are laminatedly arranged, the repeated shape configuration with the inclined surface can be independently selected for each sheet. It also permits flexibility in the combination of sheet-like members formed of different materials, especially materials having different refractive indexes. Thus, the required directivity correction can be applied to the light readily and reliably.

EMBODIMENT

(1) First Embodiment

Figure 1:
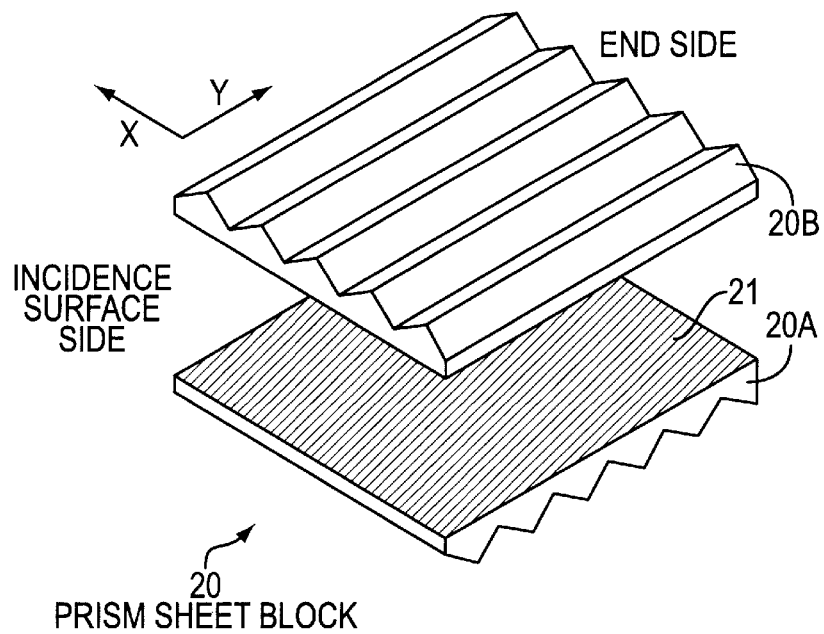
FIG. 1 is a perspective view of a prism sheet block applied to a side-light type surface light source device according to a first embodiment of the present invention.
Figure 9:
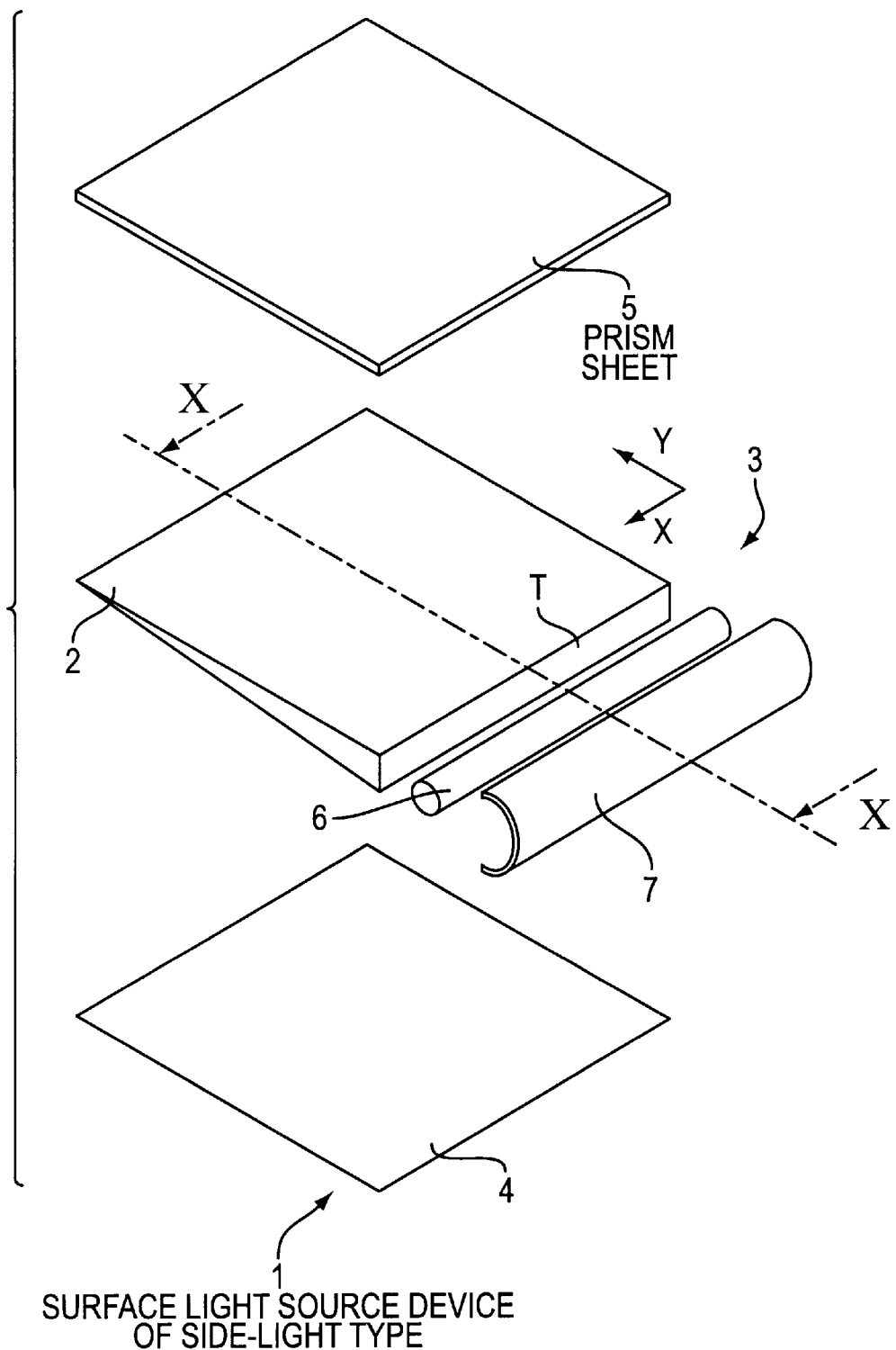
FIG. 9 is a disassembled perspective view of a conventional side-light surface light source device.

FIG. 1 is an enlarged perspective view showing part of a prism sheet block comprising a light regulator used in a side-light type surface light source device according to a first embodiment of the present invention. In the device of the invention, prism sheet block 20 is used instead of the prism sheet 5 of the side-light surface light source device 1 described with reference to FIG. 9.

The prism sheet block 20 has a first single-sided prism sheet 20A and a second single-sided prism sheet 20B, these prism sheets being arranged laminatedly. The inner sheet, meaning the first single-sided prism sheet 20A arranged relatively close to the light guide plate 2, is disposed with the prism surface facing inwards toward the light guide plate 2. The second single-sided prism sheet 20B is arranged with the prism surface facing outward, away from the light guide plate 2.

The prism surface of the first single-sided prism sheet 20A is provided with numerous projections each comprised of a pair of inclined faces to form a triangular cross-section. These projections are parallel to the light incidence surface and are repeatedly disposed perpendicularly to the light incidence surface. While the prism surface of the second single-sided prism sheet 20B is also provided with numerous projections each comprised by a pair of inclined faces to form a triangular cross-section, the projections of the prism sheet 20B are perpendicular to the projections of the prism sheet 20A and are disposed repeatedly parallel to the light incidence surface.

Figure 11:
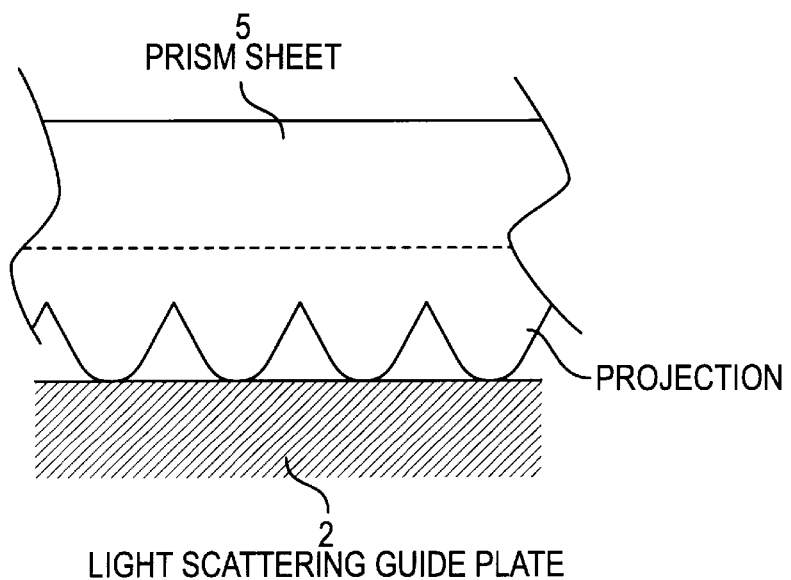
FIG. 11 is a sectional view illustrating prism sheet deformation.

In this embodiment, a vertical angle of approximately 66 degrees is selected for the projections of the first single-sided prism sheet 20A, and an vertical angle of approximately 100 degrees is selected for the projections of the second single-sided prism sheet 20B. The first single-sided prism sheet 20A is formed of an acrylic sheet that has a low refractive index and is not readily deformed by heat or force, while the second single-sided prism sheet 20B is formed of a polycarbonate that has a high refractive index. This effectively prevents the prism sheet block 20 from being subject to deformation as described with reference to FIG. 11. In general, the prism sheet block 20 allows the combination of the first and second single-sided prism sheets 20A and 20B to be flexibly changed, thereby also allowing the directivity of the side-light type surface light source device to be flexibly changed.

In accordance with this embodiment, the light scattering means between the first and second prism sheets 20A and 20B is a roughened surface formed on the first single-sided prism sheet 20A. The roughened inner surface of the prism sheet 20A is matted and faces the prism sheet 20B. The surface of the prism sheet 20B facing the matt surface of prism sheet 20A is a mirror (smooth) surface. The roughness of the matt surface is designed to prevent the generation of Newton's rings from being caused by spaces between the first and second prism sheets 20A and 20B, and to prevent loss of directivity of the emitted light. As a practical standard, an arithmetical mean roughness Ra about 0.05 $\mu$m or below may be employed.

Figure 10A:
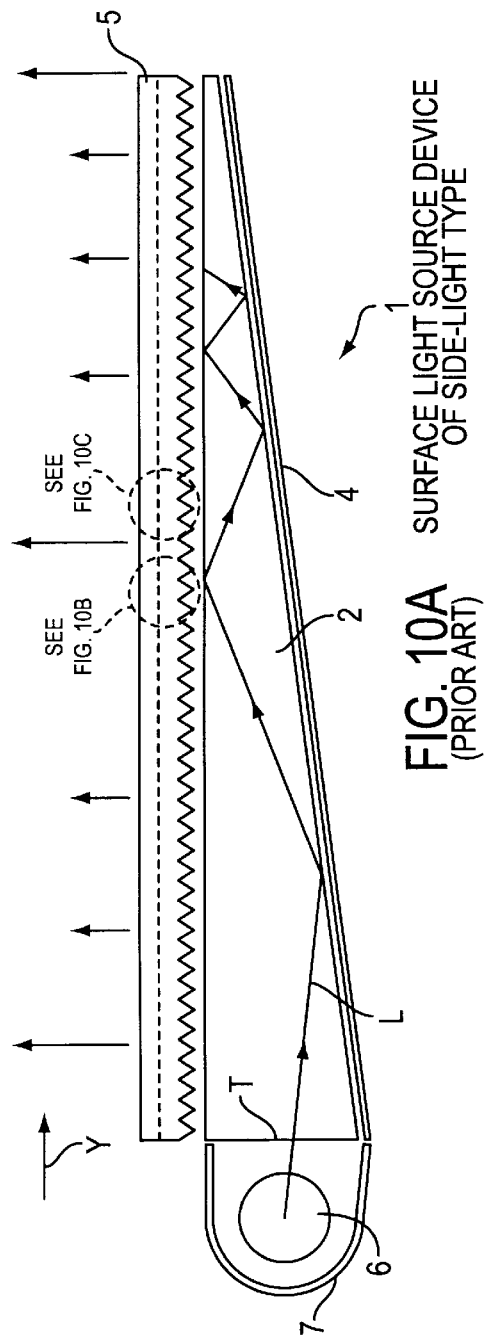
FIG. 10 is a sectional view along line A—A of FIG. 9.
Figure 10C:
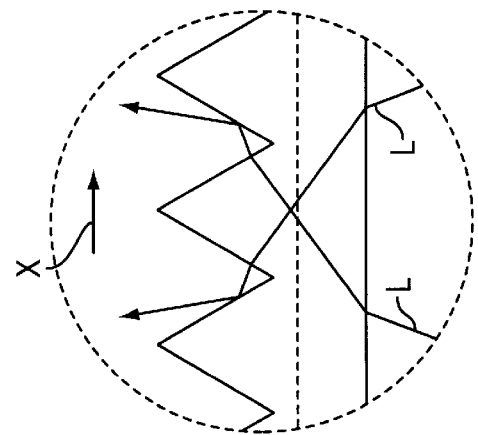
Figure 10B:
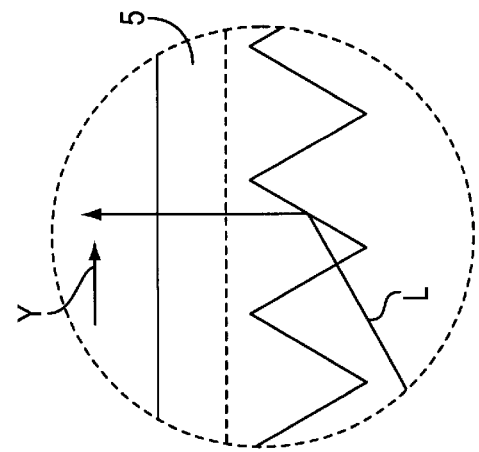

The surface light source device of this embodiment can be provided by using the above light regulator instead of the prism sheet 5 used in the device configuration of FIG. 10. In this surface light source device, light from the lamp 6 is directed into the light guide plate 2 through light incidence surface T, either directly or via the reflector 7. Inside the light guide plate 2, the light is propagated in a series of reflections repeatedly between the sloping surface and the exit surface during which it is also subjected to scattering. Each reflection by the sloping surface is accompanied by a decrease in the angle of light incidence with respect to the exit surface. Components at or below the critical angle relative to the exit surface are emitted from the exit surface and introduced into the prism sheet block 20, where the directivity (the direction of principal propagation) is corrected.

The light introduced into the prism sheet block 20 is deflected to the front by the inclined faces of the projections formed on the first single-sided prism sheet 20A, while divergence in the X-direction is corrected by the inclined faces of the projections of the second single-sided prism sheet 20B. The result is the frontal emission of light from the exit surface with high directivity. An important point is that the light is diffused by the rough surface formed on the exit surface of the first single-sided prism sheet 20A. This diffusion effectively prevents interference patterns, such as Newton's rings, from being caused by minute spaces between the first and second prism sheets 20A and 20B.

Directivity characteristics can be changed independently with respect to the X- and Y-directions by replacing single-sided prism sheet 20A or 20B with one formed of a different material or having projections with a different vertical angle. It goes without saying that directivity in both the X- and Y-directions can be changed by changing both the first and second prism sheets 20A and 20B. Since the first single-sided prism sheet 20A is formed of an acrylic sheet that is not readily deformed by heat or force, deformation of the tips of the projections (see FIG. 11) on the first prism sheet 20A is suppressed, thereby preventing degradation of the directivity caused by long term use. Forming a rough surface (light-diffusing surface) also helps to prevent the prism sheets 20A and 20B from sticking together after long term use, which in turn prevents unevenness in the light intensity caused by patterns appearing on the exit surface. The scattering effect of the rough surface on the prism sheet 20A also suppresses reflections from the light guide plate sides and edges of the light incidence surface that show up as bright lines from the exit surface.

In terms of principle, compared with the use of a double-sided prism sheet having no diffusing surface, there is a possibility of a decrease in directivity when the first single-sided prism sheet 20A provided with a light-diffusing surface is employed. However, in practice the degree of roughness that is enough to prevent the appearance of Newton's rings hardly causes degradation in directivity. The graphs of FIGS. 2 and 3 are based on measurements to demonstrate this.

Figure 2:
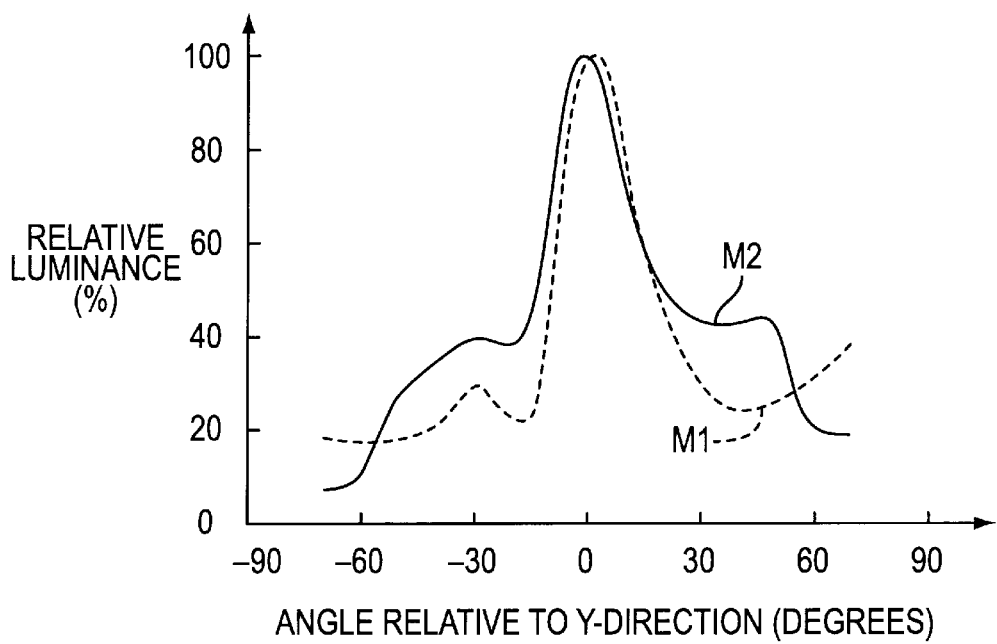
FIG. 2 shows a characteristic curve to explain the directivity of the side-light type surface light source device of FIG. 1.

The graph of FIG. 2 is a plot of measured values of the distribution of light exit angles along a longitudinal cross-section (perpendicular to the light incidence surface), setting the frontal direction to the exit surface angle at zero degrees and regarding the forward direction toward the end of the wedge as positive direction. The graph of FIG. 3 is a plot of measured values of the distribution of light exit angles along a transverse cross-section (parallel to the light incidence surface), based on the same format as FIG. 2. The light guide plate 2 used in the measurements of FIGS. 2 and 3 had a light incidence surface measuring 135 mm by 184 mm, and a thickness of 3.0 mm down to 0.5 mm. Curve M1 is based on measurements taken with the double-sided prism sheet arranged along the exit surface, and curve M2 is based on measurements taken using the above-described prism sheet block in place of the double-sided prism sheet.

With respect to the Y-direction, a comparison of the curves M1 and M2 shows almost no observable difference in directivity in the range −20 to +20 degrees. In the range −50 to +45, a slight decline in directivity in the case of the arrangement of this embodiment (M2) can be seen. At the outer sides, it can be seen that there is rather an improvement in the directivity.

Figure 3:
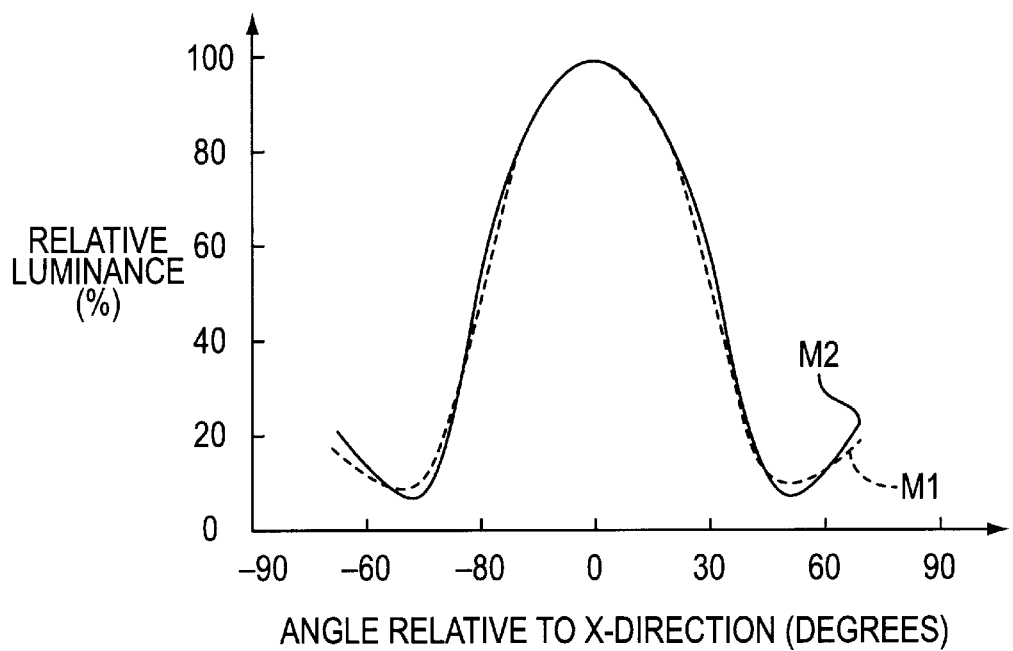
FIG. 3 shows a characteristic curve to explain directivity in a direction perpendicular to the direction to which the curve of FIG. 2 relates.

With respect to the X-direction, from FIG. 3 it can be seen that there is almost no difference between M1 (double-sided prism sheet) and M2 (the present embodiment). Thus, even the first single-sided prism sheet 20A on which a light-diffusing surface is formed, in accordance with this embodiment, provides effective directivity correction in both the X- and Y-directions. Particularly with respect to the X-direction, the effect is very small.

From this, it can be seen that the arrangement of this invention provides design directivity flexibility based on the flexible selectivity that can be applied to the combination of single-sided prism sheets used, preventing the generation of Newton's rings without any major degradation in directivity. Thus, degradation in the quality of the emitted light can be avoided and the required directivity obtained, readily and reliably.

(2) Second Embodiment

Figure 4:
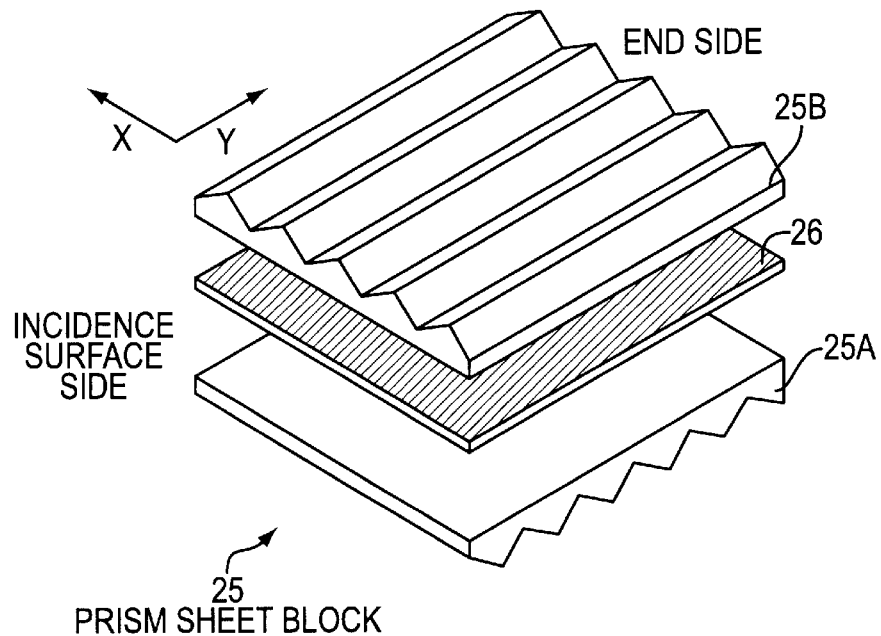
FIG. 4 is a perspective view of a prism sheet block applied to a side-light type surface light source device according to a second embodiment of the present invention.

FIG. 4 is a perspective view of a prism sheet block applied to a side-light type surface light source device according to a second embodiment of the present invention. This embodiment uses a prism sheet block 25 in place of the prism sheet block 20 described with reference to FIG. 1.

With reference to FIG. 4, prism sheet block 25 is formed as a lamination of first and second prism sheets 25A and 25B, and a diffusion sheet 26 disposed between the prism sheets 25A and 25B. Each of the first and second prism sheets 25A and 25B has a mirror (smooth) surface. These mirror surfaces are arranged facing each other. The first and second prism sheets 25A and 25B each have the same type of prism surface as the prism sheet block 20 of the first embodiment. These prism surfaces are each provided with an array of projections each comprised of a pair of inclined faces to form a triangular cross-section.

These projections run parallel to the light incidence surface in the X-direction (first single-sided prism sheet) and perpendicular to the light incidence surface in the Y-direction (second single-sided prism sheet), and are arrayed repeatedly in the Y-direction perpendicular to the light incidence surface (first single-sided prism sheet) or parallel to the light incidence surface in the X-direction (second single-sided prism sheet). The first and second prism sheets 25A and 25B are formed of the same resin used to form the first and second prism sheets 20A and 20B of the first embodiment, thereby effectively preventing deformation of the projections on the first single-sided prism sheet 25A.

The prism sheet block 25 allows the combination of the first and second single-sided prism sheets 25A and 25B to be flexibly changed, thereby allowing the directivity of the side-light type surface light source device to be flexibly changed. In this embodiment the diffusion sheet 26 providing the light diffusing means is formed of a semi-transparent film. The light diffusing power of the diffusion sheet 26 is designed to prevent Newton's rings from being caused by spaces between the first and second prism sheets 25A and 25B, and prevent loss of directivity of the emitted light.

Figure 5:
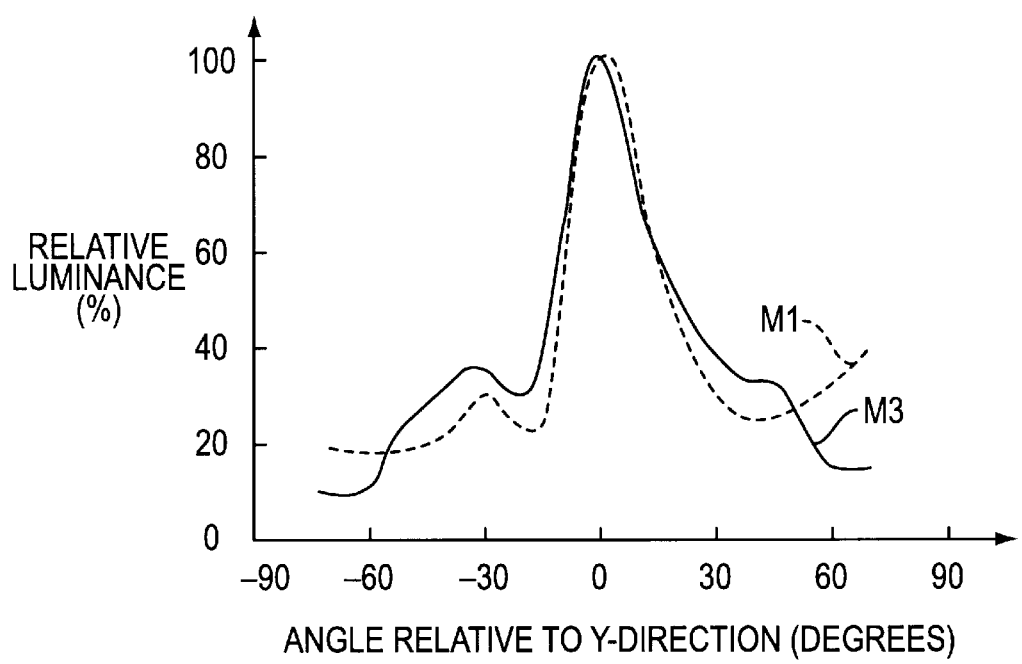
FIG. 5 shows a characteristic curve to explain the directivity of the side-light type surface light source device of FIG. 4.
Figure 6:
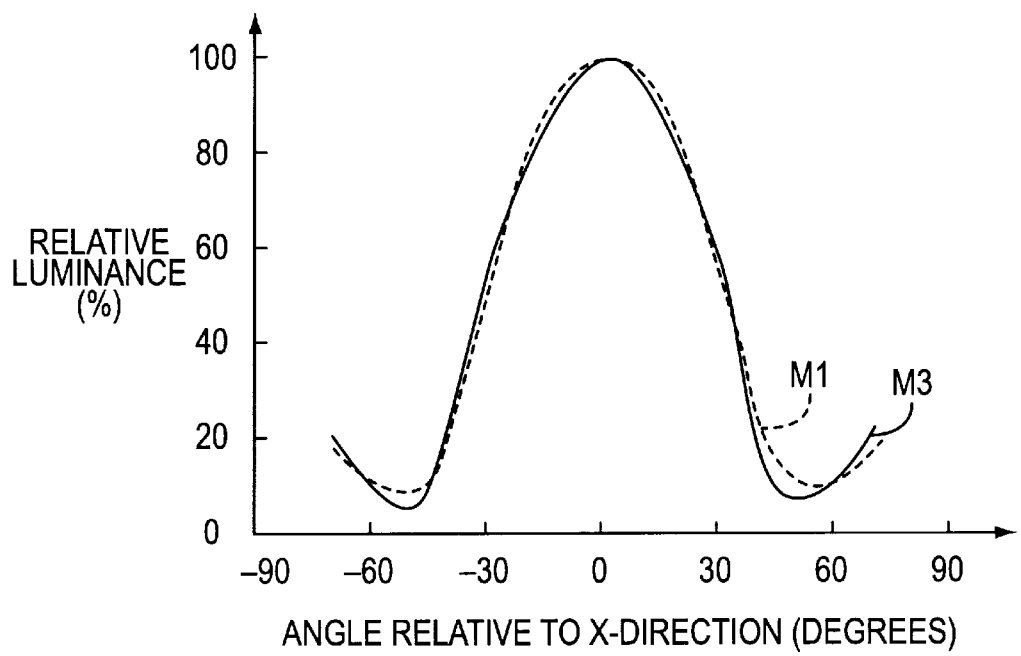
FIG. 6 shows a characteristics curve of directivity perpendicular to the direction to which the curve of FIG. 5 relates.

The configuration shown in FIG. 4 can provide the same effect as the arrangement of the first embodiment. FIGS. 5 and 6 are verification graphs, prepared using the same conditions under which the graphs of FIGS. 2 and 3 were obtained. Thus, the graph of FIG. 5 is a plot of measured values of the distribution of light exit angles along a longitudinal cross-section, and the graph of FIG. 6 is a plot of measured values of the distribution of light exit angles along a transverse cross-section. The graphs include both the characteristic curve M3 obtained with the arrangement of this embodiment, and the curve M1 obtained using a double-sided prism sheet.

A comparison of curves M1 and M3 yields virtually the same conclusion as the comparison between M1 and M2 described earlier. That is, with respect to the Y-direction, there is almost no observable difference in directivity between M1 (double-sided prism sheet) and M3 (this embodiment) in the range −20 to +20 degrees. In the range −50 to +45, a slight loss of directivity in the case of the arrangement of this embodiment (M3) can be seen. At the outer sides, it can be seen that there is rather an improvement in the directivity. With respect to the X-direction, from FIG. 6 it can be seen that there is almost no difference between M1 (double-sided prism sheet) and M3 (the present embodiment). Thus, even this arrangement in which the diffusion sheet 26 is provided between the first and second prism sheets 25A and 25B, in accordance with this embodiment, keeps effective directivity correction in both the X- and Y-directions. Particularly with respect to the X-direction, affection is very small.

From this, it can be seen that the arrangement according to this invention provides design directivity flexibility based on the flexible selectivity that can be applied to the combination of single-sided prism sheets used, preventing the generation of Newton's rings without any major degradation in directivity. Thus, degradation in the quality of the emitted light can be avoided and the required directivity obtained, readily and reliably.

Figure 7:
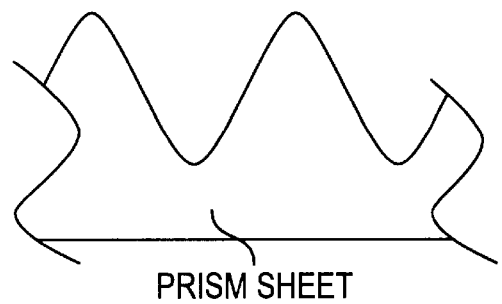
FIG. 7 is a sectional view of a prism sheet used in a prism sheet block according to another embodiment of the invention.
Figure 8:
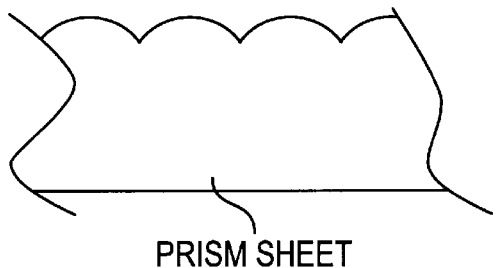
FIG. 8 is a sectional view illustrating a modified embodiment other than FIG. 7.

Although the light regulators of the first two embodiments are provided with numerous projections having a triangular cross-section, the configuration is not limited to an array of such projections having a triangular cross-section. Instead, various other configurations can be used. As one example the arrayed projections may have sinusoidal cross-sections, as shown in FIG. 7, or arc-shaped cross-sections as shown in FIG. 8.

In the same way, the projections are not limited to being arranged in a one-dimensional array, but may instead be arrayed in two dimensions to form a series of square or triangular pyramid-shaped arrangements. It is also possible to use a combination of two types of prism sheets having differently-shaped projections. For example, a prism sheet block may be comprised by a combination of a prism sheet having prism projections with an arc-shaped cross-section with a prism sheet having prism projections with a triangular cross-section.

Also, while in the first embodiment the light diffusing surface was formed on the inner prism sheet, the H invention is not limited to that arrangement. For example, a diffusing surface may be provided on the outer prism sheet, or on both prism sheets. Also, while in the first embodiment a rough surface is formed by applying a matt finish, various other roughening means may be applied to form the light scattering surface (rough surface), including sandblasting and chemical etching. Or, the light scattering surface may be formed by adherence of a light diffusing material such as semi-transparent ink.

Similarly, although the scattering light guide plate used in the above embodiments is formed by distributing light-permeable particles, the invention is not limited to that arrangement. For example, a scattering light guide plate may be formed by using a distribution of particles of silica or the like. Furthermore, the light guide plate may be comprised of a wedge-shaped or flat transparent plate. The light regulator of the invention may be applied to a side-light or other type of surface light source device, such as a surface light source device in which the illuminating light enters via a plate-shaped optical member on the rear surface.

While the surface light source device according to the present invention is applied to a liquid-crystal display, it may also be applied to other types of displays and to various other lighting devices.

As described in the foregoing, the arrangements according to the present invention comprises providing light scattering means between a pair of sheet-like members on which are arrayed projections with inclined surfaces restraining Newton's rings from being caused by the presence of spaces between the two sheet-like members. As a result, degradation of the quality of emitted light is effectively avoided and the required directivity can be obtained readily and reliably.

What is claimed is:

1. A light regulator comprising:

a first sheet-like member formed as a repetition of a shape configuration, oriented in a first direction, having an inclined surface;

a second sheet-like member formed as a repetition of a shape configuration, oriented in a second direction, having an inclined surface, wherein the second direction is perpendicular to the first direction; and light scattering means, wherein the first sheet-like member, the second sheet-like member and the light scattering means are laminatedly arranged so that the repetition of a shape configuration of the second sheet-like member is directed opposite with the repetition of a shape configuration of the first sheet-like member, with the light scattering means disposed between the first and second sheet-like members.

2. A light regulator according to claim 1, wherein a diffusion sheet disposed between the first and second sheet-like members provides said light scattering means.

3. A light regulator according to claim 2, wherein the first and second sheet-like members are formed of different materials.

4. A light regulator according to claim 3, wherein the first and second sheet-like members have mutually different refractive indexes.

5. A light regulator according to claim 1, wherein at least. one of opposing surfaces of the first and second sheet-like members is a light scattering surface that provides said light scattering means.

6. A surface light source device in which directivity of illuminating light emitted from an exit surface of a plate-shaped optical member is corrected in both a first plane and a second plane by a light regulator arranged along the exit surface, wherein said light regulator includes a first sheet-like member formed as a repetition of a shape configuration, oriented in a first direction, having an inclined surface, a second sheet-like member formed as a repetition of a shape configuration, oriented in a second direction, having an inclined surface, wherein the second direction is perpendicular to the first direction, and a light scattering means, wherein the first and second sheet-like members and light scattering means being laminatedly arranged so that the repetition of a shape configuration of the second sheet-like member is directed opposite with said repetition of a shape configuration of the first sheet-like member, with the light scattering means between the first and second sheet-like members.

7. A surface light source device according to claim 6, wherein a diffusion sheet disposed between the first and second sheet-like members provides said light scattering means.

8. A surface light source device according to claim 6, wherein at least one of opposing surfaces of the first and second sheet-like members is a light scattering surface that provides said light scattering means.

9. A surface light source device according to claim 6, wherein the first and second sheet-like members are formed of different materials.

10. A surface light source device according to claim 9, wherein the first and second sheet-like members have mutually different refractive indexes.

* * * * *

UNITED STATES PATENT AND TRADEMARK OFFICE
CERTIFICATE OF CORRECTION

PATENT NO.:     6,104,854
DATED     :     August 15, 2000
INVENTOR(S):    Masaki et al.

It is certified that errors appear in the above-identified patent and that said Letters Patent is hereby corrected as shown below:

Column 2,
    line 45, after "as" insert --the--.

Column 3,
    line 52, change "X-the" to --the X--.

Column 9,
    line 28, delete "H".

Column 10,
    line 24, delete ".".

Signed and Sealed this

Twenty-fourth Day of April, 2001

*Attest:*

NICHOLAS P. GODICI

*Attesting Officer*      Acting Director of the United States Patent and Trademark Office